US010216367B1

(12) United States Patent
Patel

(10) Patent No.: US 10,216,367 B1
(45) Date of Patent: Feb. 26, 2019

(54) AUTOMATED VISUALIZATION AND INTERACTION ALGORITHM

(71) Applicant: Dhaval Patel, San Diego, CA (US)

(72) Inventor: Dhaval Patel, San Diego, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 266 days.

(21) Appl. No.: 15/223,336

(22) Filed: Jul. 29, 2016

(51) Int. Cl.
| | |
|---|---|
| *G06F 3/00* | (2006.01) |
| *G06F 3/0482* | (2013.01) |
| *G06F 3/0481* | (2013.01) |
| *B64D 43/00* | (2006.01) |
| *G08G 5/00* | (2006.01) |

(52) U.S. Cl.
CPC ........... *G06F 3/0482* (2013.01); *B64D 43/00* (2013.01); *G06F 3/04817* (2013.01); *G08G 5/0047* (2013.01)

(58) Field of Classification Search
CPC . G06F 3/0482; G06F 3/04817; G08G 5/0047; B64D 43/00
See application file for complete search history.

(56) References Cited

U.S. PATENT DOCUMENTS

| | | | |
|---|---|---|---|
| 6,404,431 B1 | 6/2002 | Farmer | |
| 8,221,122 B2 | 7/2012 | Neely | |
| 8,918,271 B2 | 12/2014 | Pendry et al. | |
| 9,767,621 B2 * | 9/2017 | Chang | G06T 19/20 |
| 2008/0313183 A1 * | 12/2008 | Cunningham | G06F 17/30241 |
| 2013/0321458 A1 * | 12/2013 | Miserendino | H04L 41/0883 345/629 |

* cited by examiner

*Primary Examiner* — Samantha (Yuehan) Wang
(74) *Attorney, Agent, or Firm* — Tarolli, Sundheim, Covell & Tummino LLP

(57) ABSTRACT

One example includes an automated visualization and interaction algorithm. The algorithm includes processing a configuration file to ascertain definitions associated with a specified visualized dataset, and generating and providing queries to a data management tool via a network service interface based on the definitions to access dataset components from the data management tool. The algorithm also includes generating a dataset layer and assigning a category to the dataset layer based on the dataset components. The algorithm further includes assigning a behavior to the dataset layer based on the dataset components, the at least one behavior defining visual characteristics of the dataset layer, and generating a graphical rendering of the dataset layer based on the dataset components to display the dataset layer as a visualized dataset via a graphical user interface (GUI).

22 Claims, 9 Drawing Sheets

AUTOMATED VISUALIZATION AND INTERACTION ALGORITHM

This invention was made with Government support under Contract No. F33657-01-C-4600. The Government has certain rights in this invention.

TECHNICAL FIELD

The present disclosure relates generally to graphical user interfaces (GUIs), and specifically to an automated visualization and interaction algorithm.

BACKGROUND

Visualization systems, such as for aviation and/or other vehicle-based missions, can be beneficial for a variety of tactical and logistical purposes. As an example, a Digital Aeronautical Flight information File (DAFIF) is a comprehensive database of frequently-updated global aeronautical data. The DAFIF includes information regarding airports, airways, airspaces, navigation data, and other aeronautical data. The DAFIF can provide the information as geospatial features within a number of datasets, with each dataset including a large number of sets of features, and with each set of features including a very large number of attributes. Visualizing a given dataset for an aeronautical application can require a very large and detailed programming effort to ascertain and integrate all of the features that are required for the visualization, which can require a very large number of source lines of code (SLOC).

SUMMARY

One example includes a computer readable medium configured to store instructions that, when executed, are configured to implement a method for automatically implementing an automated visualization and interaction algorithm. The method includes processing at least one configuration file to ascertain definitions associated with a specified visualized dataset, and generating and providing queries to a data management tool via a network service interface based on the definitions to access dataset components from the data management tool. The method also includes generating a dataset layer based on the dataset components, and assigning a category to the dataset layer based on the dataset components, the category corresponding to visualization grouping of the dataset layer based on a unique identifier. The method further includes assigning at least one behavior to the dataset layer based on the dataset components, the at least one behavior defining visual characteristics of the dataset layer, and generating a graphical rendering of the dataset layer based on the dataset components to display the dataset layer as a visualized dataset via a graphical user interface (GUI).

Another example includes a computer readable medium configured to store instructions that, when executed, are configured to implement a method for automatically implementing an automated visualization and interaction algorithm. The method includes processing at least one configuration file to ascertain definitions associated with a specified visualized dataset. The method also includes accessing a geospatial map software program configured to provide a geographical map and generating a dataset layer based on the definitions. The method also includes assigning a category to the dataset layer based on the definitions, the category corresponding to visualization grouping of the dataset layer based on a unique identifier and assigning at least one behavior to the dataset layer based on the definitions, the at least one behavior defining visual characteristics of the dataset layer. The method also includes generating at least one interactive component associated with the dataset layer based on the definitions, the at least one interactive component defining a respective at least one interactive characteristic of the dataset layer in response to a user input. The method further includes generating a graphical rendering of the dataset layer on the geographical map based on the dataset components to display the dataset layer superimposed on the geographical map as a visualized dataset via a graphical user interface (GUI).

Yet another example includes a computer readable medium configured to store instructions that, when executed, are configured to implement a method for automatically implementing an automated visualization and interaction algorithm. The method includes processing at least one configuration file to ascertain definitions associated with a specified visualized dataset and generating at least one dataset layer based on the definitions. The method also includes iteratively generating at least one dataset sub-layer for each of the at least one dataset layer, each of the at least one dataset sub-layer corresponding to a feature associated with the respective one of the dataset layer. The method also includes iteratively assigning a category to each of the at least one dataset sub-layer for each of the at least one dataset layer based on the definitions, the category corresponding to visualization grouping of the respective at least one dataset sub-layer based on a unique identifier. The method also includes iteratively assigning at least one behavior to each of the at least one dataset sub-layer for each of the at least one dataset layer based on the definitions, the at least one behavior defining visual characteristics of the respective at least one dataset sub-layer. The method further includes generating a graphical rendering of each of the at least one dataset layer based on the dataset components, and publishing each of the at least one dataset layer to a graphical user interface (GUI) to display each of the at least one dataset layer as the visualized dataset.

DETAILED DESCRIPTION

The present disclosure relates generally to graphical user interfaces (GUIs), and specifically to an automated visualization and interaction algorithm. The automated visualization and interaction algorithm (AVIA) can be implemented on a visualization controller, which can be hardware, software, or a combination thereof. The AVIA can be configured to automatically integrate a visualized dataset, such as based on data associated with Digital Aeronautical Flight Information File (DAFIF). Therefore, the AVIA can publish the visualized dataset on a graphical user interface (GUI), such as for aviation and navigation purposes. As an example, the DAFIF data can be transmitted via shape files to a data store (e.g., database) that can be queried by a data management tool (e.g., accessible via a network service interface).

The visualization controller can receive one or more configuration files that can provide definitions associated with a specified visualized dataset. As an example, the configuration file(s) can be Extensible Markup Language (XML) files that can define a geographic region associated with the visualized dataset, as well as dataset components that correspond to attributes of the visualized dataset. The attributes thus provide specific components to be rendered in the visualized dataset, as well as interactive components that provide specific data and/or behavioral features in response to user input data. The AVIA is thus configured to process the configuration file(s) to ascertain the definitions and to access the dataset components from the data store. For example, the AVIA can generate and send queries to the data management tool via the network service interface to access the dataset components corresponding to the definitions from the database. The AVIA can iteratively generate multiple dataset layers based on the dataset components, with each of the dataset layers including one or more dataset sub-layers corresponding to features associated with the respective dataset layer. The AVIA can also iteratively assign categories, behaviors, and/or interactive components associated with the dataset sub-layers. The dataset layer(s) can thus be collectively assigned a rendering, such as based on the definitions in the configuration file(s), and can be collectively published to the GUI as the visualized dataset.

Figure 1:
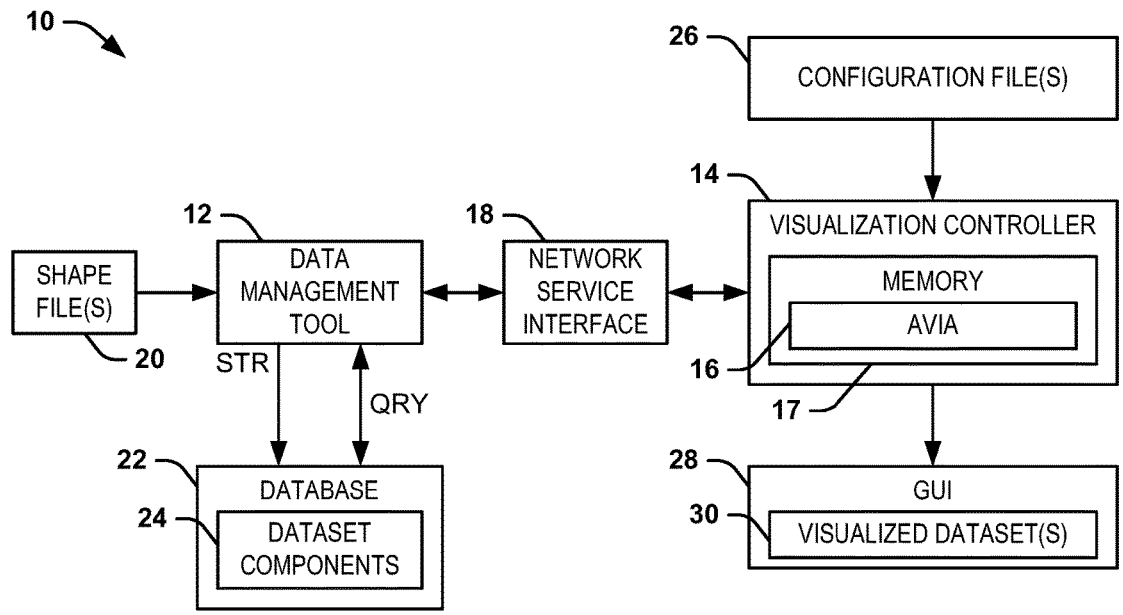
FIG. 1 illustrates an example of a visualization system.

FIG. 1 illustrates an example of a visualization system 10. The visualization system 10 can be implemented in a variety of applications to visualize large sets of data. As an example, the visualization system 10 can be implemented to visualize aviation information, such as for navigation, logistics, and/or military mission applications.

The visualization system 10 includes a data management tool 12 and a visualization controller 14. The data management tool 12 can be configured as any of a variety of commercial-off-the-shelf (COTS) mapping interface programs that can read shape files (e.g., .SHP files) and query data. The visualization controller 14 can be configured as hardware, software, or a combination thereof, and is configured to implement an automated visualization and interaction algorithm (AVIA) 16 stored in a memory 17. In the example of FIG. 1, the data management tool 12 and the visualization controller 14 are separated via a network service interface 18 that is configured to provide communicative connectivity between the data management tool 12 and the visualization controller 14, such as via a network (e.g., the Internet).

The data management tool 12 is configured to receive one or more shape files 20 that can be provided from a Digital Aeronautical Flight Information File (DAFIF) distribution. The data management tool 12 can store the shape file(s) 20 in a database 22 that is configured to store dataset components 24. In the example of FIG. 1, the storage of the dataset components 24 is demonstrated via a signal STR. As an example, the shape file(s) 20 can be provided to the data management tool 12 and stored in the database 22 in response to implementation of the AVIA 16, or can be provided at a time prior (e.g., upon creation of the database 22). For example, the dataset components 24 can correspond to a wide variety of visualization data, graphical representations of structures, supporting information, and other relevant data. For example, in the example of aviation visualization applications, the database 22 can include tables that are organized by airports, airways, air traffic routes, refueling, and a variety of other relevant aviation information.

In the example of FIG. 1, the visualization controller 14 can be configured to receive one or more configuration files 26 that can define characteristics of a specified visualized dataset. As an example, the configuration file(s) 26 can define information regarding a geographic region, features of the geographic region, data associated with the geographic region and/or the features, graphical features of the geographic region and/or the features, interactive components, and a variety of other information that is specified to be included in the resultant visualized dataset. The configuration file(s) 26 can be generated via any of a variety of programming means by a user or users, such as in a manner that allows for comprehension and/or customizability. For example, the configuration file(s) 26 can correspond to an Extensible Markup Language (XML) file that defines the characteristics of the specified visualized dataset.

As an example, the visualization controller 14 can be configured to implement the AVIA 16 in response to receiving the configuration file(s) 26 to automatically generate a visualized dataset based on the definitions in the configuration file(s) 16. As an example, the AVIA 16 can process the configuration file(s) 26 to provide an integration stack, corresponding to interaction with the network service interface 18, providing a rendering method for the dataset components 24, and generating user interaction with the dataset layer that is composed of the dataset components 24, as described in greater detail herein. For example, the AVIA 16 can process the configuration file(s) 26 to ascertain the definitions associated with the specified visualized dataset to generate at least one dataset layer corresponding to integrated dataset components that are to be superimposed on a geospatial map. As an example, the AVIA 16 can be configured to determine a geospatial map from the definitions in the configuration file(s) 26, and can generate the dataset layer(s) based on the definitions in the configuration file(s) 26, such as based on specified dataset components in the definitions that correspond to the dataset components 24 stored in the database 22.

For example, the AVIA 16 can determine the specified dataset components in the definitions of the configuration file(s) 26, with the specified dataset components corresponding to the specified visualized dataset. The AVIA 16 can thus generate queries to access the dataset components 24 from the database 22 that correspond to the specified dataset components in the definitions of the configuration file(s) 26. The queries can be transmitted to the data management tool 12 via the network service interface 18, such that the data management tool 12 can query the database 22 based on the queries generated by the AVIA 16. In the example of FIG. 1, the queries and the associated responses to the queries are demonstrated by a bi-directional signal QRY that interconnects the data management tool 12 and the database 22. The dataset components 24 that are returned from the queries can be provided to the visualization controller 14, such that the visualization controller 14 can store the dataset components 24 in the memory 17. The AVIA can thus generate the dataset layer(s) based on the dataset components 24 that are received as responses to the queries.

In the example of FIG. 1, the visualization system 10 includes a graphical user interface (GUI) 28 that can correspond to a computer system, a monitoring system, or a variety of other user interface systems that can be communicatively coupled to the visualization controller 14. As an example, the GUI 28 can be communicatively coupled to the visualization controller 14 via a wired connection, a wireless connection, or via a network (e.g., the Internet). The visualization controller 14 can be configured to publish the dataset layer(s) to the GUI 28 as one or more visualized datasets 30 that can be graphically depicted to a user via the GUI 28. As an example, the visualization controller 14 can be configured to superimpose the dataset layer(s) onto a geospatial map, such as specified via the configuration file(s) 26, and can provide the geospatial map and superimposed one or more dataset layer(s) as the one or more visualized dataset(s) 30. Accordingly, the user can graphically interact with the visualized dataset(s) 30 via the GUI 28, such as to assist with any of a variety of applications (e.g., aviation, navigation, or any other application that may require visualization of large amounts of data).

Therefore, as described herein, the AVIA 16 can be implemented to automate and streamline an integration process for large data applications, such as DAFIF. Additionally, the AVIA 16 can be implemented for integration of other large data applications, such as Order of Battle data, Threats and Airspace data, and/or other basic imagery data. Particularly, the AVIA 16 can provide automatic integration of the visualized dataset(s) 30 based on the definitions specified in the configuration file(s) 26, which thus results in a reduction of overall source lines of code (SLOC) for visualization applications within a GUI. As a result, implementation of the AVIA 16 decreases development costs, time-to-market, and software defects associated with visualization applications that require programming efforts to integrate the visualized datasets. As described in greater detail herein, additional benefits of implementation of the AVIA 16 include auto-generated and categorized user-interactive components, performance improvements through the use of native rendering logic, and integration of new datasets without recompiling and retesting software.

Figure 2:
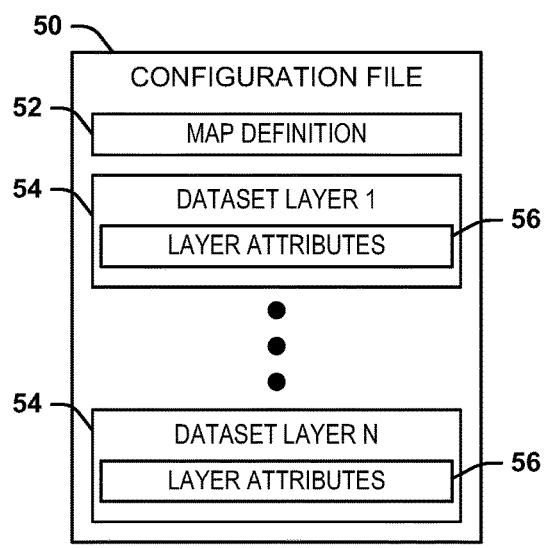
FIG. 2 illustrates an example of a configuration file.

FIG. 2 illustrates an example of a configuration file 50. The configuration file 50 can be generated to specify a desired visualized dataset to be generated via the AVIA, such as the AVIA 16 in the example of FIG. 1. The configuration file 50 can correspond to one of the configuration file(s) 26 in the example of FIG. 1. Therefore, reference is to be made to the example of FIG. 1 in the following description of the example of FIG. 2.

The configuration file 50 can be generated via any of a variety of programming means by a user or users, such as in a manner that allows for comprehension and/or customizability. For example, the configuration file 50 can correspond to an XML file that defines the characteristics of the specified visualized dataset. The configuration file 50 can thus be generated by a user to define one or a portion of one desired visualized data set. As an example, the configuration file 50 can be transmitted to or otherwise provided to a visualization controller that is configured to implement an AVIA (e.g., in response to receiving the configuration file 50) to automatically generate and integrate a visualized dataset that is published to a GUI (e.g., the GUI 28).

In the example of FIG. 2, the configuration file 50 includes a map definition 52 and a plurality N of dataset layers 54, where N is a positive integer. The map definition 52 can correspond to a geospatial map software program associated with the visualized dataset. As an example, the map definition 52 can identify a commercially-available geospatial map software program, and can provide a uniform resource identifier (URI) as to a location on a network (e.g., the Internet) or in the database 22 from which the geospatial map software program can be accessed. The map definition 52 can also designate a sub-location within the geospatial map software program that corresponds to a region of interest that corresponds to the resultant visualized dataset. For example, the map definition 52 can designate a specific region (e.g., the continent of North America, the United States of America, the state of California, a special use airspace (SUA), etc.) as the region of interest corresponding to the bounds of the respective resultant visualized dataset. The geospatial map software program can thus provide the geospatial map that corresponds to a geospatial canvas on which at least one dataset layer corresponding to integrated dataset components is to be superimposed, as described in greater detail herein.

Each of the dataset layers 54 can correspond to layers and features (e.g., sub-layers) that are formed from dataset components and associated data to be included in the dataset layer(s) that are superimposed on the geospatial map defined by the map definition 52. Each of the dataset layers 54 includes a set of attributes 56 that can correspond to location data, user information data, graphical data, interactive data, and other data associated with the features of the resultant visualized data set.

Figure 3:
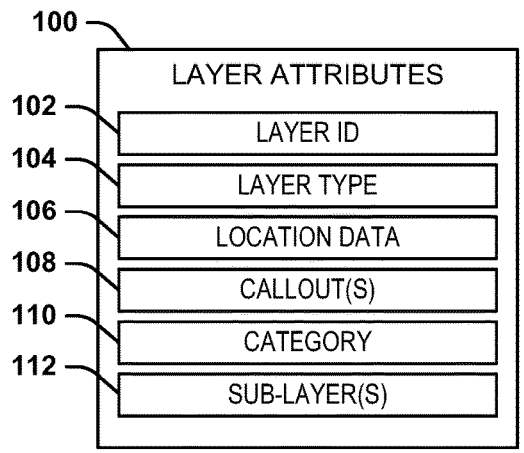
FIG. 3 illustrates an example diagram of layer attributes in a configuration file.

FIG. 3 illustrates an example diagram of layer attributes 100 in a configuration file (e.g., the configuration file 50). The layer attributes 100 can thus correspond to a set of data associated with a given one of the dataset layers 54 in the example of FIG. 2. As an example, each of the components of the layer attributes 100 can correspond to one or more fields structured as part of the respective dataset layers 54 in the configuration file 50 (e.g., an XML file). Therefore, reference is to be made to the example of FIGS. 1 and 2 in the following description of the example of FIG. 3.

The layer attributes 100 includes a layer identification (ID) 102 corresponding to an identifier for the associated dataset layer 54. As described previously, the configuration file 50 can be generated via any of a variety of programming means to allow for comprehension by a user, such that the layer ID 102 can merely correspond to identification of the dataset layer 54 by a user reading the configuration file 50. The layer attributes 100 also includes a layer type 104 that corresponds to the type of layer associated with the dataset layer 54. As an example, the layer type 104 can define a generic software class that can be implemented to project one or more of the features of the dataset layer 54 onto the geospatial map defined by the map definition 52. For example, the layer type 104 can indicate whether the respective dataset layer 54 corresponds to a feature layer, a sub-layer that is associated with another feature layer, a passive layer that has controls associated with another feature layer, or other general characteristics of how the respective dataset layer is provided on the geospatial map in the visualized dataset.

The layer attributes 100 also includes location data 106 corresponding to a location or address associated with the features of the dataset layer 54. As an example, the location data 106 can include a URI associated with each of the features associated with the layer attributes. For example, the URI(s) associated with the location data 106 can correspond to a location in the database 22 of each of the respective dataset components 24 that constitute the features of the dataset layer, and/or can correspond to address locations in a network (e.g., the Internet) where the features of the dataset layer can be accessed. As another example, the location data 106 can be implemented to request additional shape files 20 for the storage of associated dataset components 24 in the database 22 via the data management tool 12. The location data 106 can thus be implemented by the visualization controller 14 to generate the queries to access the dataset components 24 from the database 22 or from other locations (e.g., the Internet) based on the specified features in the layer attributes 100.

The layer attributes 100 also includes one or more callouts 108 that can correspond to interactive components associated with the features of the dataset layer 54. As an example, the callout(s) 108 can be used to display attribute details associated with the features of the dataset layer 54, as well as a manner of accessing the attribute details via the GUI 28. For example, the callout(s) 108 can define data access through user events or passive display, such as mouse-clicks, mouse-overs, callout balloons, labels, and other passive or active interactive features of the data or graphical components associated with the dataset layer 54 and the features therein. As an example, a mouse-over user event can trigger highlights of the feature, which may include visually enlarging and showing a glow effect for the rendered item. Therefore, the callout(s) 108 can be included in the layer attributes 100 to manipulate required features of the dataset layer and/or sub-layers.

The layer attributes 100 also includes a category 110 associated with the dataset layer 54. For example, the category 110 can indicate whether the respective dataset layer 54 corresponds to controls with which the user of the GUI 28 can interact with the visualized dataset or corresponds to graphical or geospatial features on the associated geospatial map. The category 110 can be implemented to organize the respective dataset layer 54 into one of different types of visualization groups that can be tracked based on a unique identifier, such as within a software lookup table. Thus, the respective categorization can allow for visual coordination of each of the features of the dataset using components of the GUI 28. For example, the category 110 can define whether the graphically rendered content of the dataset layer 54 corresponds to a passive graphical display, an active graphical display (such as manipulated via the callout(s) 108, as described previously), or graphical user controls that can be manipulated by the user (e.g., via the callout(s) 108) to control other dataset layer(s) 54 or associated sub-layers.

For example, the category 110 can designate labels and/or description elements of the dataset layer that can be used to organize the GUI components. The category 110 can also designate filters that can correspond to display restrictions of the dataset layer or features (e.g., sub-layers) of the dataset layer, such as for selective display of the dataset layer or features thereof. Thus, in the example when no filters are designated within the category 110, the features of the dataset layer and/or features can be aggregated with other definitions of the dataset layer or other dataset layers having identical values (e.g., as menu items). Thus, specification of the category 110 of the dataset layer 54 can allow for additional and more refined control over how features can be visualized and organized. As an example, the category 110 can be implemented to generate the components of the GUI that allows the visualization of the features of the dataset layer 54, such as to produce menu items that can toggle on and off features. Each component of the dataset layer 54 can be automatically arranged, graphically, according to the respective categorization. Therefore, the category 110 can designate the general manner in which the dataset layer 54 can be interactive with the user of the GUI 28.

The layer attributes 100 further includes the designation of one or more sub-layers 112. As an example, the sub-layer(s) 112 can correspond to graphical features or portions associated with the overall respective dataset layer 54, and can be structured in a similar manner as the dataset layer 54. For example, the sub-layer(s) 112 can be graphically rendered and/or interactive based on the respective dataset layer 54 under which the respective sub-layer(s) 112 are structured. As an example, the sub-layer(s) 112 can be designated as active, and thus are graphically rendered as a default with the respective dataset layer 54, or can be designated as passive, and can thus be invisible to the user of the GUI 28, such as until activated, toggled, or otherwise enabled (e.g., via the callout(s) 108). As another example, each of the sub-layer(s) 112 can include a set of attributes that are specific to the respective sub-layer 112, such as including a sub-layer ID 102, a sub-layer type 104, sub-layer location data 106, sub-layer callout(s) 108, and a sub-layer category 110. Therefore, the sub-layer(s) 112 can be linked to a "parent" dataset layer 54, and can otherwise behave or be programmatically structured substantially the same as a dataset layer 54.

Figure 4:
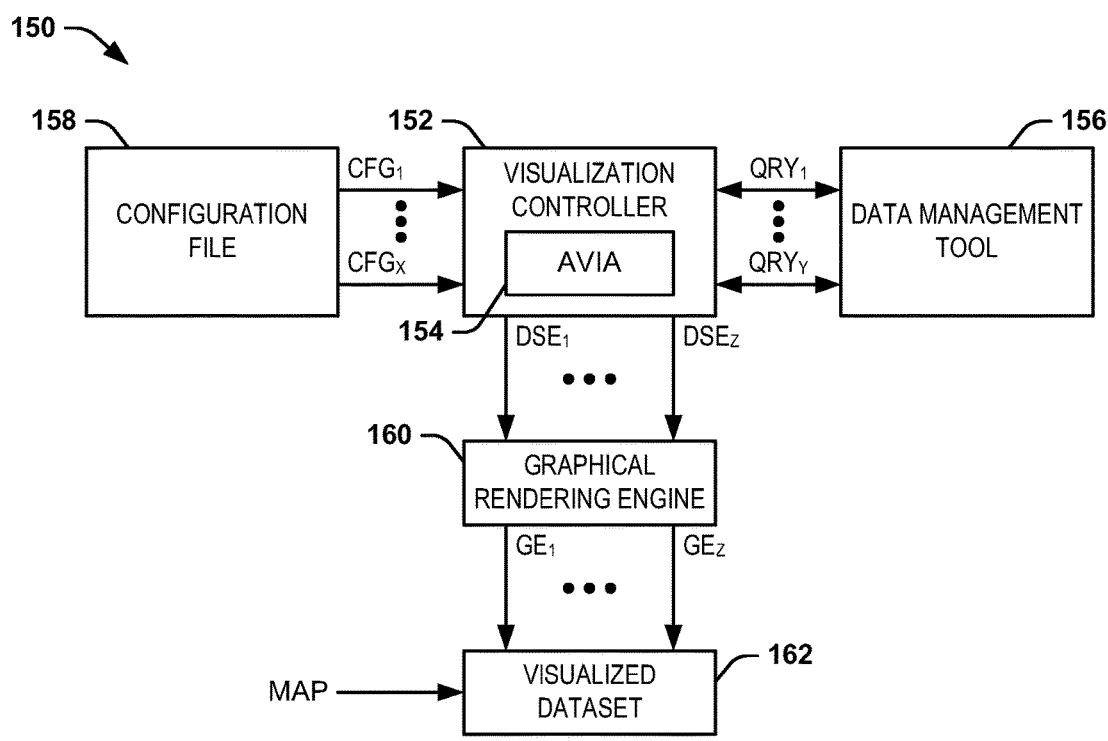
FIG. 4 illustrates an example diagram of querying in a visualization system.

FIG. 4 illustrates an example diagram 150 of querying in a visualization system, such as the visualization system 10 in the example of FIG. 1. The diagram 150 demonstrates a visualization controller 152 that is configured to implement an AVIA 154. In the example of FIG. 4, the AVIA 154 interacts with a data management tool 156 in response to receiving a configuration file 158, similar to as described previously with respect to the example of FIG. 1. Therefore, reference is to be made to the example of FIGS. 1-3 in the following description of the example of FIG. 4. It is to be understood that the diagram 150 is provided merely as a block diagram to demonstrate intercommunication between some of the components of the visualization system 10, and is not intended to represent a detailed structural diagram.

The diagram 150 demonstrates a plurality X of attributes of the configuration file 158 being provided to the visualization controller 152, demonstrated in the example of FIG. 4 as $CFG_1$ through $CFG_X$, where X is a positive integer. As an example, the AVIA 154 can be automatically implemented in response to the visualization controller 152 receiving the configuration file 158 (e.g., via a network). In response, the visualization controller 152 can process the configuration file 158 to access the attributes $CFG_1$ through $CFG_X$ of the configuration file 158. The visualization controller 152 can thus generate a plurality Y of queries, demonstrated in the example of FIG. 4 as queries $QRY_1$ through $QRY_Y$, where Y is a positive integer. The queries $QRY_1$ through $QRY_Y$ are generated to access the dataset components (e.g., the dataset components 24) that can correspond to the attributes $CFG_1$ through $CFG_X$ of the configuration file 158, such as from the database 22 via the network service interface 18. As an example, the visualization controller 152 can be configured to generate the queries based on the location data 106 in the layer attributes 100 for a given dataset layer designated in the configuration file 158, such as described previously in the example of FIG. 3.

The queries $QRY_1$ through $QRY_Y$ are provided to the data management tool 156, such as via a network service interface (e.g., the network service interface 18) to enable the data management tool 156 to access the dataset components designated by the respective queries $QRY_1$ through $QRY_Y$. The data management tool 156 can thus retrieve the dataset components from the associated location, such as the database 22, based on the location data 106 associated with the layer attributes (e.g., a URI). The data management tool 156 thus provides responses to the queries $QRY_1$ through $QRY_Y$ to the visualization controller 152, with the responses corresponding to the dataset components requested via the queries $QRY_1$ through $QRY_Y$. The visualization controller 152 can thus integrate the dataset components, such as in the manner specified in the configuration file 158, and can provide the integrated dataset components to a graphical rendering engine 160. In the example of FIG. 4, the dataset components are demonstrated as a plurality Z of dataset components $DSE_1$ through $DSE_Z$, where Z is a positive integer.

The graphical rendering engine 160 is configured to generate a graphical representation of the dataset components $DSE_1$ through $DSE_Z$. As an example, the manner in which the graphical rendering engine 160 is configured to provide the graphical rendering of the dataset components $DSE_1$ through $DSE_Z$ can be specified in the layer attributes (e.g., the layer attributes 100) that are provided via the configuration file 158, such as based on the category of the associated dataset layer (e.g., the category 110). For example, the configuration file 158 can designate the category associated with the respective dataset layer, such that the graphical rendering engine 160 can provide the features of the dataset layer as one or more of a series of points, polylines, polygons, or other predetermined types of graphical representations. Therefore, the graphical rendering engine 160 can graphically integrate the dataset components $DSE_1$ through $DSE_Z$. In the example of FIG. 4, while the graphical rendering engine 160 is demonstrated separately from the visualization controller 152, it is to be understood that the graphical rendering engine 160 can be part of the visualization controller 152.

In the example of FIG. 4, the graphically integrated dataset components are provided from the graphical rendering engine 160 as a plurality Z of graphical components GE1 through GEZ. While the quantity Z is the same for the graphical components GE1 through GEZ as it is for the dataset components $DSE_1$ through $DSE_Z$, it is to be understood that the graphical rendering of the dataset components $DSE_1$ through $DSE_Z$ can result in a different number of graphical components GE1 through GEZ. The graphical components GE1 through GEZ are combined with a geospatial map, demonstrated in the example of FIG. 4 as a signal MAP, to generate a visualized dataset 162. The visualized dataset 162 can be published to a GUI, such as the GUI 28 in the example of FIG. 1, to provide user interaction capability with the visualized dataset 162. As an example, the geospatial map MAP can be provided via the data management tool 156, such as based on specification of the geo spatial map MAP via the configuration file 158 (e.g., the map definition 52). Therefore, the visualized dataset 162 can be generated based on implementation of the AVIA 154 to correspond to the specified visualized dataset that is provided in the configuration file 158.

Figure 5:
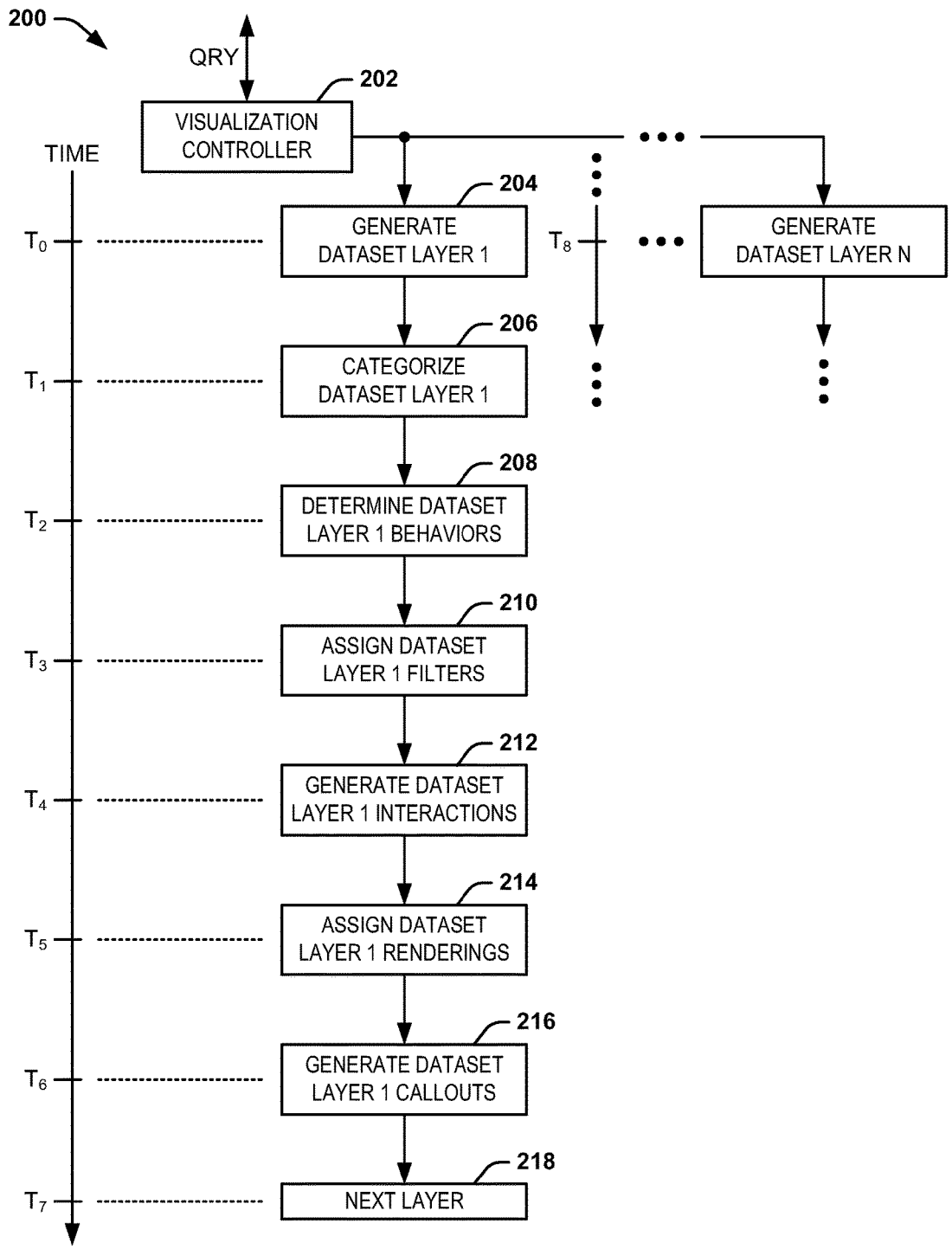
FIG. 5 illustrates an example diagram of an automated visualization and interaction algorithm (AVIA).

FIG. 5 illustrates an example timing diagram 200 of an AVIA, such as the AVIA 16 or the AVIA 154 in the respective examples of FIGS. 1 and 4. The timing diagram 200 can thus correspond to the interaction of the components demonstrated in the diagram 150, such as in response to receiving one or more configuration files 158. Therefore, reference is to be made to the examples of FIGS. 1-4 in the following description of the example of FIG. 5.

The timing diagram 200 demonstrates a visualization controller 202 that is configured to generate queries and receive responses to the queries, demonstrated as a bidirectional signal QRY in the example of FIG. 5. As an example, the visualization controller 202 is configured to implement the AVIA in response to receiving one or more configuration files, such as the configuration file 50 in the example of FIG. 2. The generation of the queries QRY can thus be in response to the visualization controller 202 processing the configuration file(s) to determine the layer attributes (e.g., the layer attributes 100 in the example of FIG. 3) for each of the one or more configuration files. In the following description of the example of FIG. 5, the queries QRY may be generated and provided sequentially, such as at each sequence of the AVIA described in the timing diagram 200.

At a time $T_0$, the AVIA generates a first dataset layer ("DATASET LAYER 1") at 204, such as based on a dataset layer ID 102 designated in a configuration file. Thus, the AVIA can subsequently generate and provide the features associated with the first dataset layer based on generating queries and receiving responses based on the layer attributes 100 of the first dataset layer in a sequential manner. At a time $T_1$, the AVIA can categorize the first dataset layer at 206. The categorization of the first dataset layer can be based on the category 110 of the layer attributes 100 of the first dataset layer, such as by specifying that the first dataset layer corresponds to graphical controls, graphical data, or another category of the first dataset layer.

At a time $T_2$, based on the categorization of the first dataset layer, the AVIA determines the behaviors of the first dataset layer at 208. As an example, the behaviors can correspond to a manner as to how the first dataset layer is to be displayed on the GUI 28 based on the category of the first dataset layer. For example, the behavior can correspond to whether the first dataset layer is, by default, visible or whether the first dataset layer is, by default, passive, and thus not visible until activated, toggled, or otherwise enabled, but are still associated with behaviors and/or controls associated with other dataset layers and/or dataset sub-layers. The visibility behavior can also correspond to a measure of translucence, such as to enable the user to view elements that are otherwise occluded by the features of the first dataset layer. Other behaviors of the first dataset layer can be specified, as well, based on the category, such as to include labels of the features of the first dataset layer. Thus, the behaviors of the first dataset layer can vary widely based on the category of the first dataset layer and/or based on the information provided in the configuration file(s). As an example, aspects of the behaviors can be accessed by the visualization controller 202 via the queries, such as based on a URI provided for the graphical behaviors specified in the configuration file, or in a predetermined manner based on the defined category of the first dataset layer. Furthermore, the behavior of the first dataset layer can be aggregated with behaviors of other dataset layers or dataset sub-layers associated with the resultant visualized dataset to generate complex composite behaviors of the resultant visualized dataset.

At a time $T_3$, the AVIA assigns filters to the first dataset layer at 210, such as likewise based on the categorization of the first dataset layer. As an example, the filters can correspond to display restrictions of the first dataset layer, such as for selective display of the dataset layer. For example, the filters can be associated with another dataset layer and/or dataset sub-layer to provide selective enabling or disabling of the dataset layer or dataset sub-layer based on user inputs provided through the controls of the GUI 28 associated with the other dataset layer(s) or sub-layer(s). The filters can thus likewise allow for selective grouping together of aggregate dataset layers or dataset sub-layers, such as for selection of multiple dataset layers or dataset sub-layers in response to user inputs provided through the controls of the GUI 28. The filters can also be linked to the behaviors, such that filters can affect and/or be affected by the visibility state of the dataset layer, such as for purposes of activation and deactivation of the dataset layer or dataset sub-layer via the controls of the GUI 28.

At a time $T_4$, the AVIA generates interactions for the first dataset layer at 212, with the interactions corresponding to data and/or changes to the displayed portions of the first dataset layer or features (e.g., sub-layers) of the first dataset layer in response to interaction with the visualized dataset via user inputs provided through the GUI 28. As an example, the interactions can be based on the behaviors of the first dataset layer, such as defined by or as specified by the category 110. For example, the interactions can correspond to the display of attribute details associated with the features of the first dataset layer, such as defining highlighting of graphical elements of the first dataset layer, displaying additional information associated with the graphical elements of the first dataset layer, and/or otherwise modifying the display of one or more of the graphical elements of the first dataset layer. The graphical elements of the first dataset layer, as defined by the interactions, can correspond to the entirety of the first dataset layer or one or more sub-layers associated with the first dataset layer. Thus, the graphical elements, as provided via the interactions and responsive to user inputs provided via the GUI 28, can correspond to the graphical responses to the toggling of graphical buttons, interacting with pull-down menus, highlighting graphical elements, enlarging graphical elements, providing callout balloons, or any of a variety of other graphical responses to user inputs.

At a time $T_5$, the AVIA assigns graphical renderings for the first dataset layer, at 214, for graphical rendering of the first dataset layer via a graphical rendering engine (e.g., the graphical rendering engine 160. The assignment of the graphical renderings of the first dataset layer can be based on the location data 106 of the first dataset layer, and thus the requested location (e.g., URI) of the first dataset layer and/or the features associated with the first dataset layer. Thus, the requested dataset components can correspond to the dataset components that are retrieved via the queries QRY that can define the graphical elements to be graphically rendered via the graphical rendering engine 160. As another example, the assignment of the graphical rendering of the first dataset layer can also be based on or based in part on the category 110 of the first dataset layer, and thus defined by the categorical type of the first dataset layer.

At a time $T_6$, the AVIA generates callouts for the first dataset layer at 216. The callouts can thus correspond to the user interactions that are provided via the GUI 28 to activate the interaction results that were generated at 212. For example, the callouts can include user events or graphical controls that provide activation of otherwise passively displayed graphical content. For example, the callouts can include mouse-clicks, mouse-overs, graphical toggle buttons, keyboard entries, or any of a variety of inputs that can be provided through the graphical controls of the GUI 28 or from peripheral device inputs. Therefore, in combination with the interactions, the callouts can generate callout balloons, provide labels, enable highlighting or labeling in response to mouse-over events, enable activation (from passive to active) of graphical features (e.g., dataset sub-layers) in response to toggle buttons, or any of a variety of ways to manipulate graphical features of the dataset layer and/or sub-layers.

At a time $T_7$, the AVIA selects a next dataset layer for processing at 218. As an example, the next dataset layer can be a standalone dataset layer, or can be a dataset sub-layer associated with the first dataset layer. The AVIA can process the next dataset layer in a similar manner as described previously based on the configuration file 50, by generating the next dataset layer starting at a time $T_8$, then categorizing the next dataset layer, determining behaviors of the next dataset layer, assigning filters to the next dataset layer, generating interactions for the next dataset layer, assigning graphical renderings to the next dataset layer, and generating callouts for the next dataset layer. The AVIA can thus iteratively process each of the N dataset layers of the configuration file 50 in a manner similar to the first dataset layer. Upon processing all N of the dataset layers, the processed dataset layers can be combined with the geospatial map data to generate the visualized dataset 30 that can be published to the GUI 28.

Figure 6:
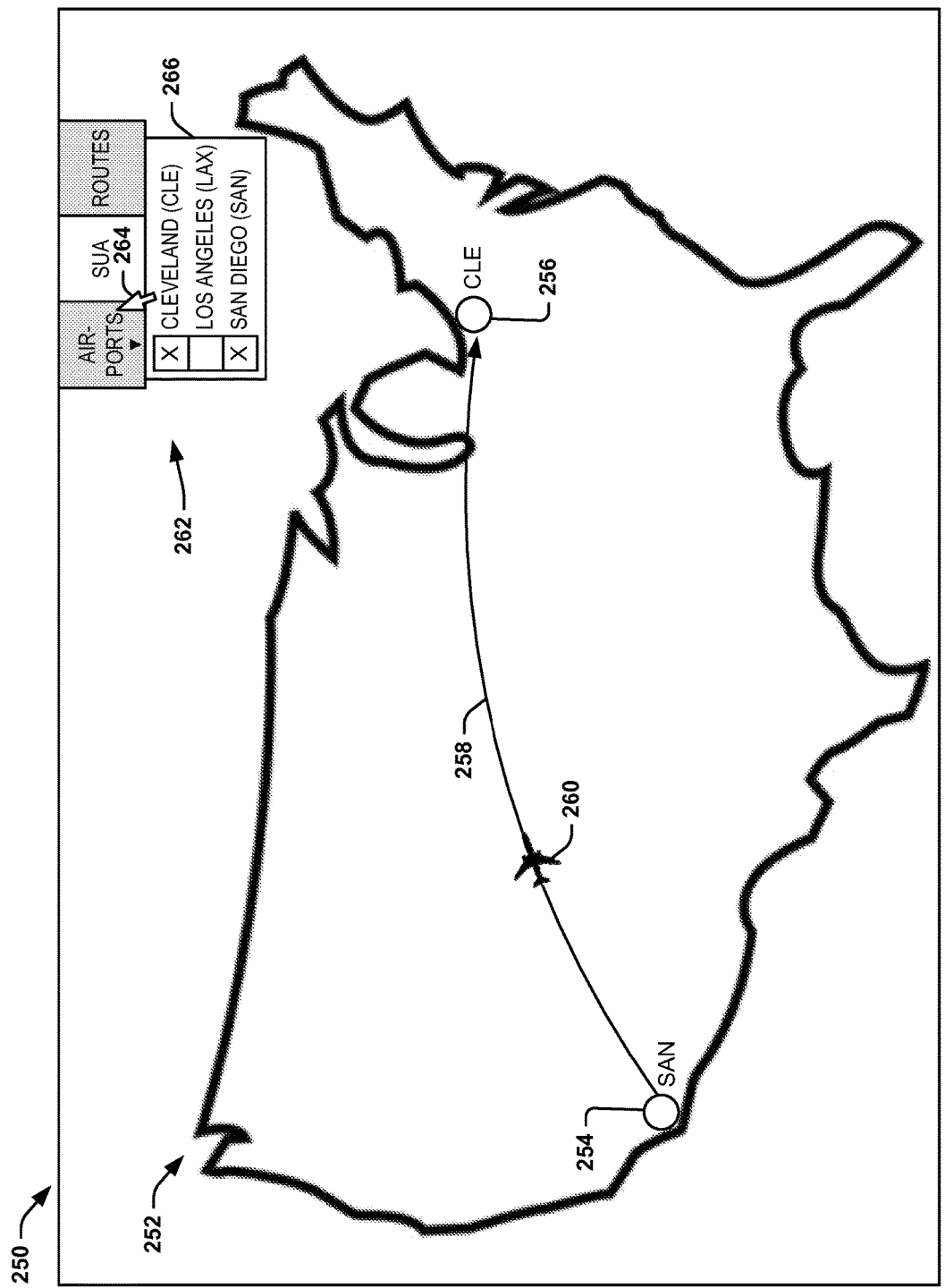
FIG. 6 illustrates an example diagram of a visualized dataset.

FIG. 6 illustrates an example diagram 250 of a visualized dataset. The diagram 250 can correspond to the results of the implementation of the AVIA, as demonstrated in the examples of FIGS. 4 and 5, and can thus correspond to display of the visualized dataset 30 via the GUI 28. Therefore, reference is to be made to the examples of FIGS. 1-5 in the following description of the example of FIG. 6.

The diagram 250 demonstrates a map 252, demonstrated in the example of FIG. 5 as being a map of the United States of America, a first airport 254, a second airport 256, a flight path 258, an aircraft icon 260, and user controls 262. The first airport 254 is demonstrated as an icon representing San Diego International Airport and includes a label "SAN", and the second airport 256 is demonstrated as an icon representing Cleveland International Airport and includes a label "CLE". The flight path 258 is demonstrated as a flight path that approximately connects the first and second airports 254 and 256 based on a flight path of an aircraft that can, for example, have a real-time location that is represented by the aircraft icon 260. As an example, the diagram 250 can thus demonstrate a visualized dataset of a real-time flight progress of an aircraft represented by the aircraft icon 260 between San Diego and Cleveland, as displayed via the GUI 28.

The visualized dataset represented in the diagram 250 can be generated by a configuration file 50. For example, the map 252 can be defined in the map definition 52 of the configuration file 50. Additionally, the map definition 52 can provide additional map details, such as a map of airports (e.g., San Diego International Airport, Cleveland International Airport, and Los Angeles International Airport, as described in greater detail herein). As an example, the other map details can be accessible from the visualized content of the diagram 250. The configuration file 50 can also include dataset layers 54 corresponding to the graphical features displayed in the visualized dataset, which can have been integrated via the AVIA.

As a first example, the user controls 262 can correspond to a first visualized dataset 54, which can be integrated as buttons that can be toggled via a mouse (demonstrated in the example of FIG. 6 at 264). A first button of the user controls 262 is demonstrated as "AIRPORTS", which can be provided as a toggle to provide a pull-down menu 266 that allows the user to select the display of one or more of Cleveland International Airport (CLE), Los Angeles International Airport (LAX), and/or San Diego International Airport (SAN). As an example, the pull-down menu 266 can correspond to a dataset sub-layer of the first dataset layer 54 corresponding to the user controls 262. The appearance of the pull-down menu 266 can be based on interactions and callouts associated with the first dataset layer 54, such that the passive sub-layer of the pull down menu 266 is activated for display in response to a user input of toggling the "AIRPORTS" button of the user controls 262. In the example of FIG. 6, the user has selected display of Cleveland (CLE) and San Diego (SAN). The user controls 262 also demonstrates a button for Special Use Airspace ("SUA") that is demonstrated as toggled off, and a button for flight routes ("ROUTES") that is toggled on.

As another example, the airports can correspond to a second visualization layer 54, with each of San Diego International Airport 254, Cleveland International Airport 256, and Los Angeles International Airport (not shown) corresponding to separate respective dataset sub-layers of the second dataset layer 54. Thus, the interactions for the sub-layers of each of San Diego International Airport 254, Cleveland International Airport 256, and Los Angeles International Airport can be based on the callouts provided by the pull down menu 266 of the user controls 262. Therefore, in the example of FIG. 6, the user has selected the display of San Diego (SAN) and Cleveland (CLE), but not Los Angeles (LAX). Accordingly, the interactions provided in the configuration file 50 for the sub-layers associated with San Diego (SAN) and Cleveland (CLE) provide for display of the first airport 254 associated with Cleveland (CLE) and the second airport 256 associated with San Diego (SAN) (e.g., from a passive display state to an active display state), but not an airport associated with Los Angeles (LAX). Additionally, the labels of "SAN" and "CLE" can likewise correspond to interactions, or can be grouped with the icons associated with the airports 254 and 256, respectively.

Similarly, the flight path 258 and the aircraft icon 260 can correspond to one or two separate respective dataset layers 54 or dataset sub-layers, and can be displayed from a passive state to an active state based on the callouts provided via user interaction with the user controls 262. In the example of FIG. 6, the "ROUTES" button of the user controls 262 can be implemented based on callouts to provide display of the flight path 258 and/or the aircraft icon 260. As an example, the interactions provided in the configuration file 50 for the sub-layers associated with flight path 258 and the aircraft icon 260 provide for display of the flight path 258 and the aircraft icon 260 (e.g., from a passive display state to an active display state). As an example, the visualization controller 14 can operate in conjunction with location data, such as provided from an inertial measurement unit (IMU) to monitor data associated with a location of the aircraft represented by the aircraft icon 260, such that the location of the aircraft can be monitored via the GUI 28.

Figure 7:
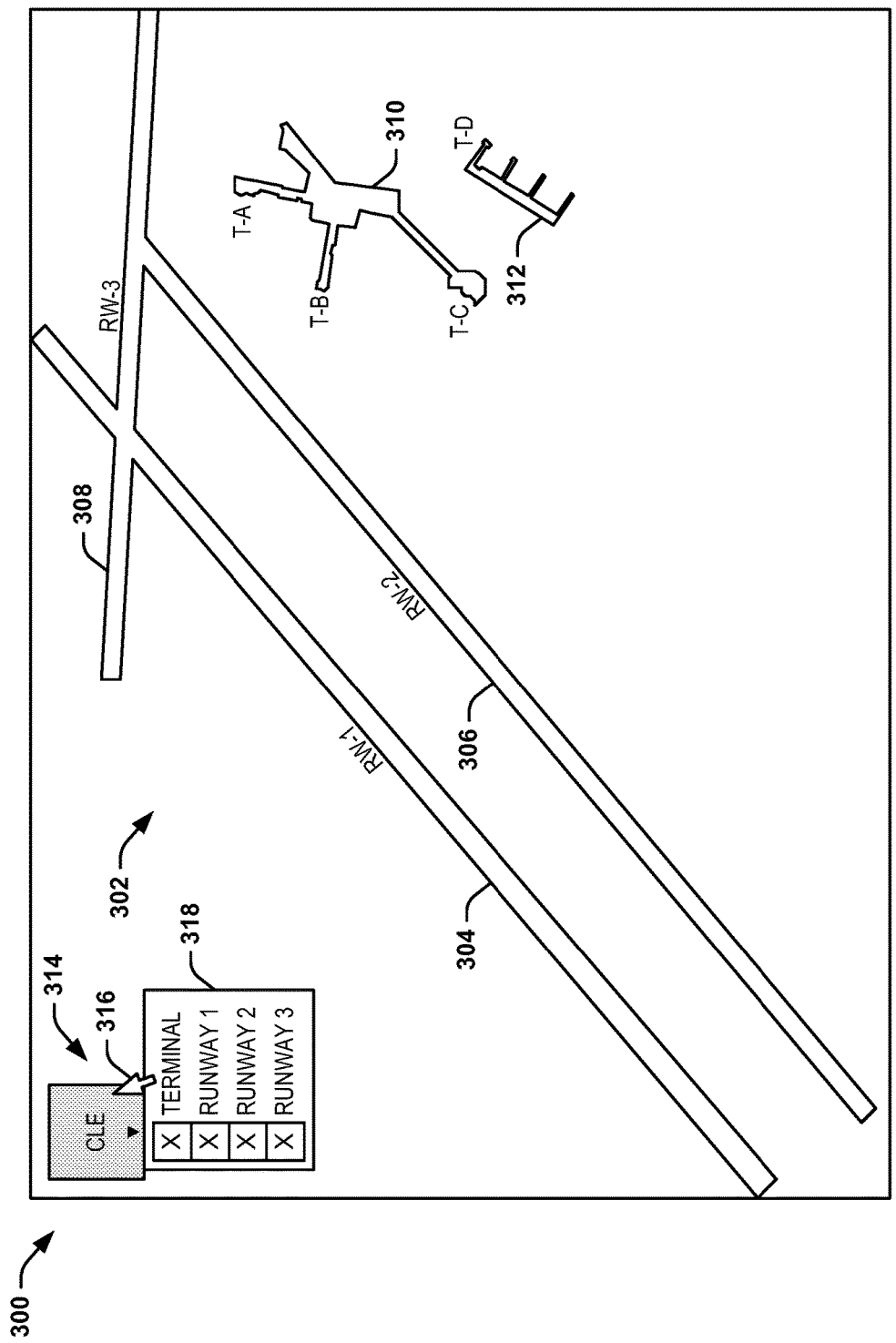
FIG. 7 illustrates another example diagram of a visualized dataset.

FIG. 7 illustrates another example diagram 300 of a visualized dataset. The diagram 300 can correspond to the results of the implementation of the AVIA, as demonstrated in the examples of FIGS. 4 and 5, and can thus correspond to display of the visualized dataset 30 via the GUI 28. Therefore, reference is to be made to the examples of FIGS. 1-5 in the following description of the example of FIG. 7.

In the example of FIG. 7, the diagram 300 demonstrates a map 302 that corresponds to Cleveland International Airport. As an example, the user controls 262 in the visualized dataset of the example of FIG. 6 can provide callouts to allow the user to navigate to a different geospatial map that corresponds to one or more of Cleveland International Airport (CLE), Los Angeles International Airport (LAX), and/or San Diego International Airport (SAN). The diagram 300 also includes a first runway (labeled "RW-1") 304, a second runway (labeled "RW-2") 306, and a third runway (labeled "RW-3") 308. The diagram 300 also includes a first terminal building 310 that includes terminals with the labels "T-A", "T-B", and "T-C", as well as a second terminal building 312 that includes a terminal with the label "T-D". The diagram 300 further includes user controls 314. Therefore, the diagram 300 demonstrates a visualized dataset that corresponds to a zoomed version of Cleveland International Airport, such as accessible from the visualized dataset in the diagram 250 in the example of FIG. 6.

The visualized dataset represented in the diagram 300 can be generated by a configuration file 50, which could be the same or a separate configuration file 50 that was implemented for the visualized dataset in the example of FIG. 6. For example, the map 302 can be defined in the map definition 52 of the configuration file 50. The configuration file 50 can also include dataset layers 54 corresponding to the graphical features displayed in the visualized dataset, which can have been integrated via the AVIA. As an example, the configuration file 50 can define the separate the features As an example, the terminals 310 and 312, the first runway 304, the second runway 306, and the third runway 308 can correspond to a first dataset layer 54 integrated via the AVIA. As an example, the AVIA can have generated and received queries that correspond to the graphical features, as well as the data associated with the terminals 310 and 312, the first runway 304, the second runway 306, and the third runway 308. For example, the labels can be associated with the callouts 108 of the associated first dataset layer, or can correspond to dataset sub-layers associated with the first dataset layer. Thus, the labels and the graphical display of the terminals 310 and 312, the first runway 304, the second runway 306, and the third runway 308 can be provided in an active state as a default, and can be toggled on and off, such as based on user events provided via the user controls 314.

As an example, the user controls 314 can correspond to a second visualized dataset 54, which can be integrated as a button that can be toggled via a mouse (demonstrated in the example of FIG. 7 at 316). The button of the user controls 314 is demonstrated as "CLE", which can be provided as a toggle to provide a pull-down menu 318 that allows the user to select the display of one or more of the features of Cleveland International Airport (CLE), demonstrated as the terminals 310 and 312, the first runway 304, the second runway 306, and the third runway 308. As an example, the pull-down menu 318 can correspond to a dataset sub-layer of the second dataset layer 54 corresponding to the user controls 314. The appearance of the pull-down menu 318 can be based on interactions and callouts associated with the second dataset layer 54, such that the passive sub-layer of the pull down menu 318 is activated for display in response to a user input of toggling the "CLE" button of the user controls 314. In the example of FIG. 7, the user has selected display of all of the terminals 310 and 312, the first runway 304, the second runway 306, and the third runway 308. Therefore, all of the terminals 310 and 312, the first runway 304, the second runway 306, and the third runway 308 are displayed in the visualized dataset.

Figure 8:
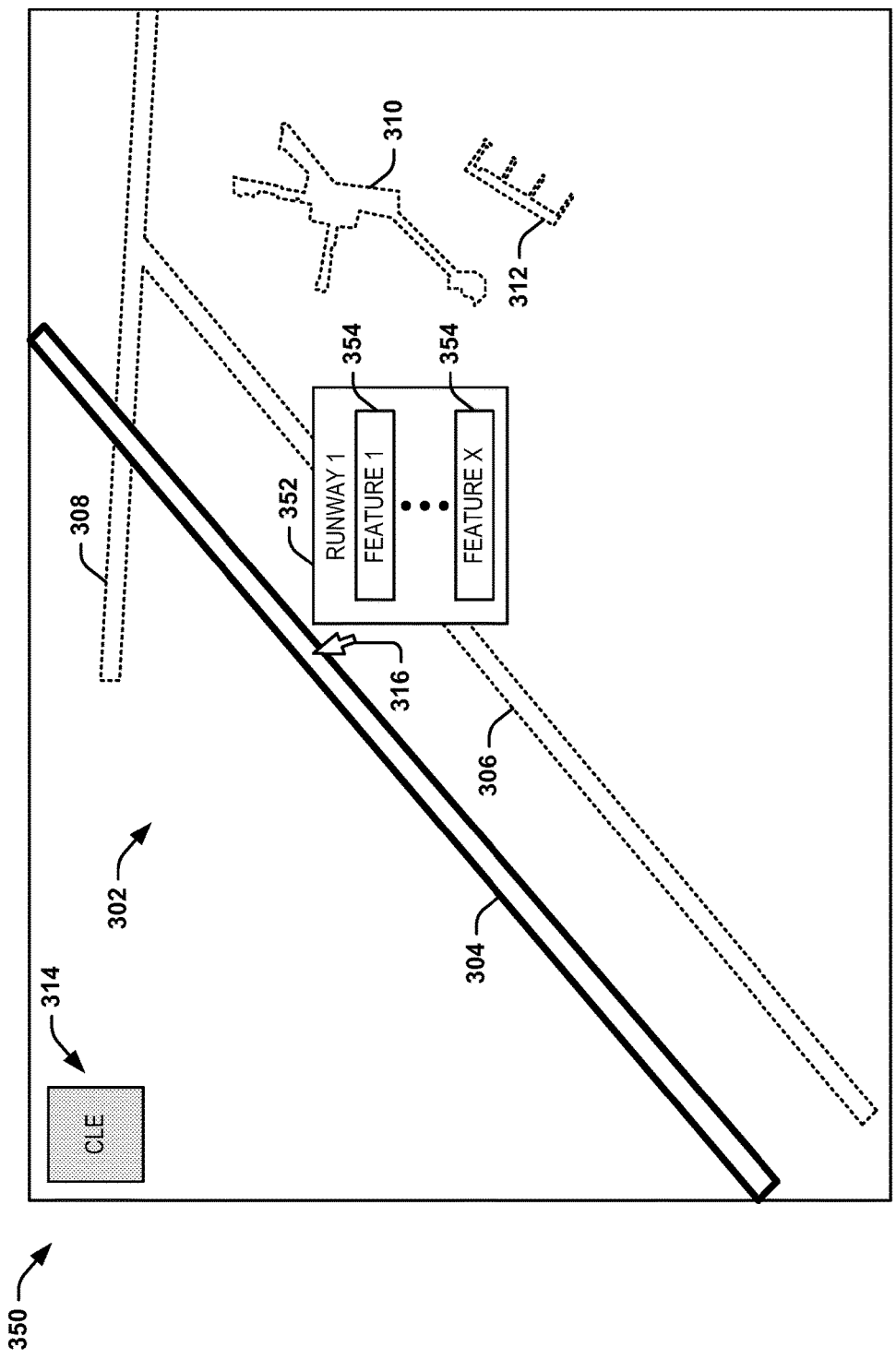
FIG. 8 illustrates yet another example diagram of a visualized dataset.

FIG. 8 illustrates yet another example diagram 350 of the visualized dataset demonstrated in the example of FIG. 7. The diagram 350 can correspond to interactions that result from user events provided as inputs via the GUI 28. Therefore, reference is to be made to the examples of FIG. 7 in the following description of the example of FIG. 8.

The diagram 350 demonstrates the first runway 304, the second runway 306, the third runway 308, and the terminals 310 and 312. The second runway 306, the third runway 308, and the terminals 310 and 312 are demonstrated in the diagram 350 as having been grayed out, such as based on having been toggled-off via the user controls 314. In the example of FIG. 8, the diagram 350 demonstrates either a mouse-over or a mouse-click event occurring with respect to the first runway 304 via the mouse 316. As a result, the first runway 304 is demonstrated as being bold, which could correspond to a glow, a highlight, or any of a variety of other ways to provide greater visual emphasis on the first runway 304 to demonstrate that it has been "selected". Additionally, in response to the callout of selection of the first runway 304, a pop-up feature set 352 is demonstrated as having appeared based on the interaction features integrated into the dataset layer or dataset sub-layer associated with the first runway 304. The pop-up feature set 352 can thus have been activated from a passive state to an active state in response to interaction with the first runway 304, such as based on the integrated filters associated with the features of the first runway 304 in response to the callout corresponding to the activating user event. The pop-up feature set 352 can thus provide further graphical data to the user, demonstrated in the example of FIG. 8 as a set of X features 354 that can correspond to data associated with the first runway 304. Accordingly, the visualized dataset can be provided in a variety of ways based on the interactions that are automatically integrated into the visualized dataset and which are instantiated in response to the user inputs.

Figure 9:
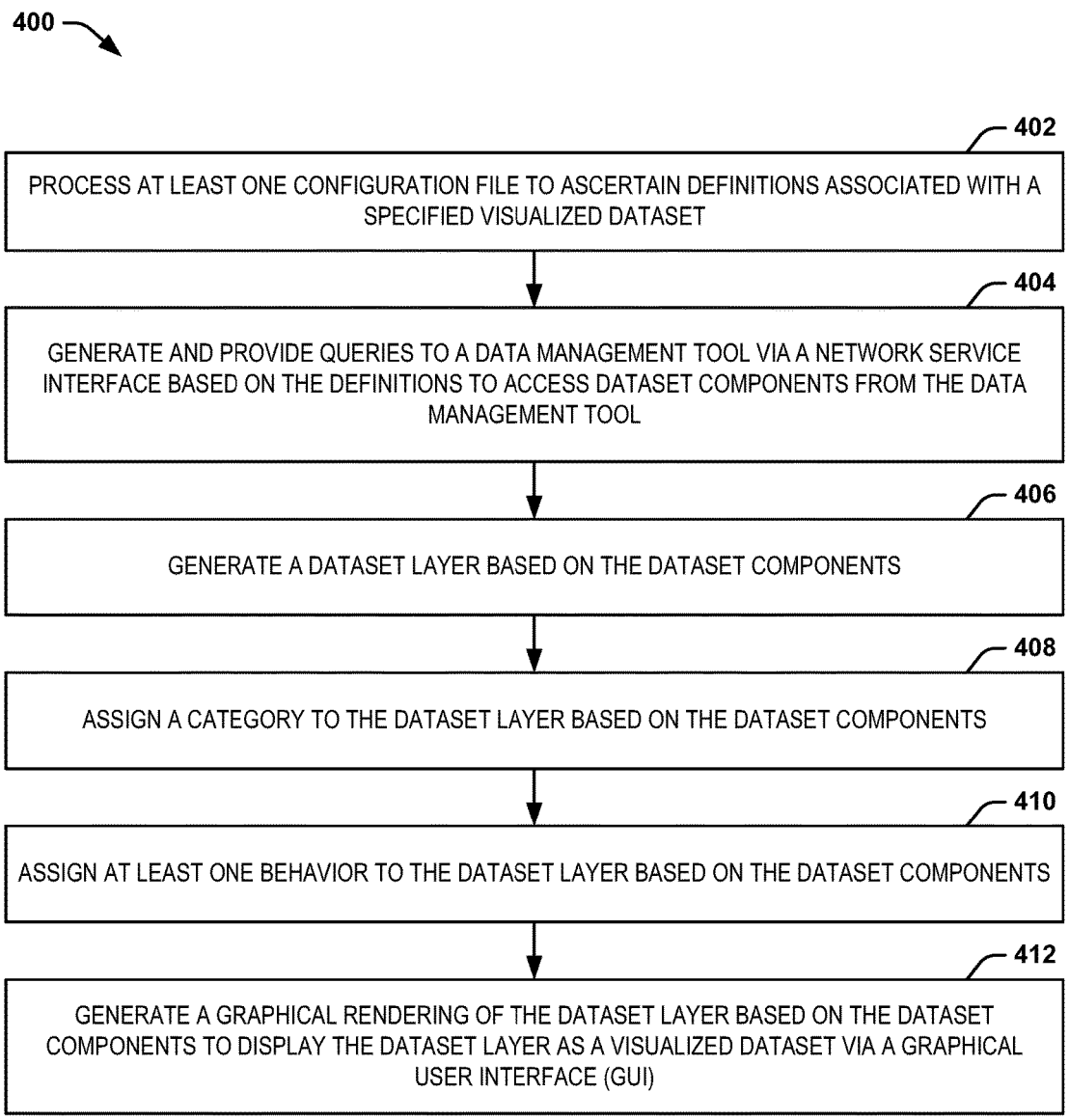
FIG. 9 illustrates an example of a method for automatically implementing an automated visualization and interaction algorithm (AVIA).
Figure 10:
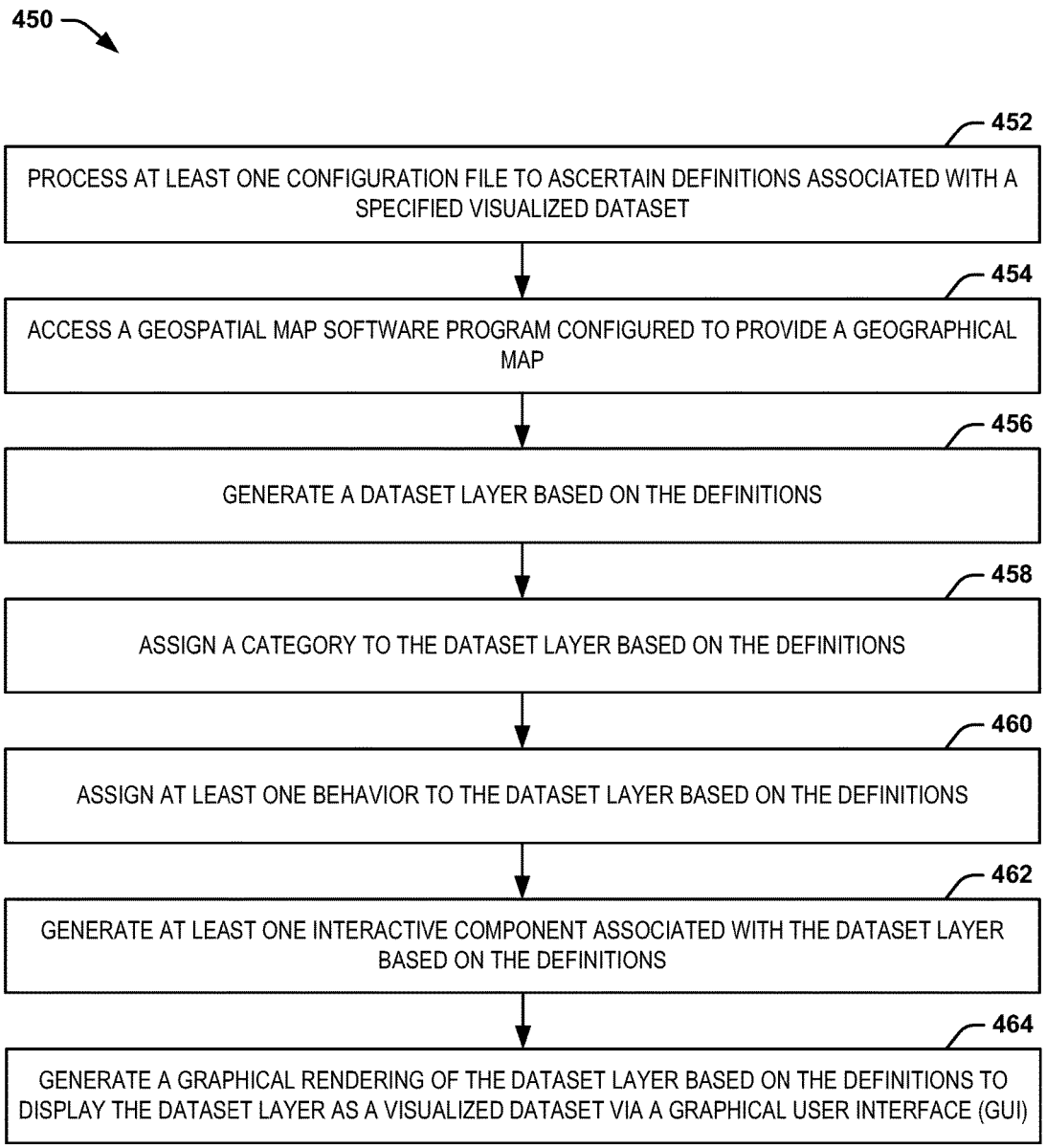
FIG. 10 illustrates another example of a method for automatically implementing an AVIA.
Figure 11:
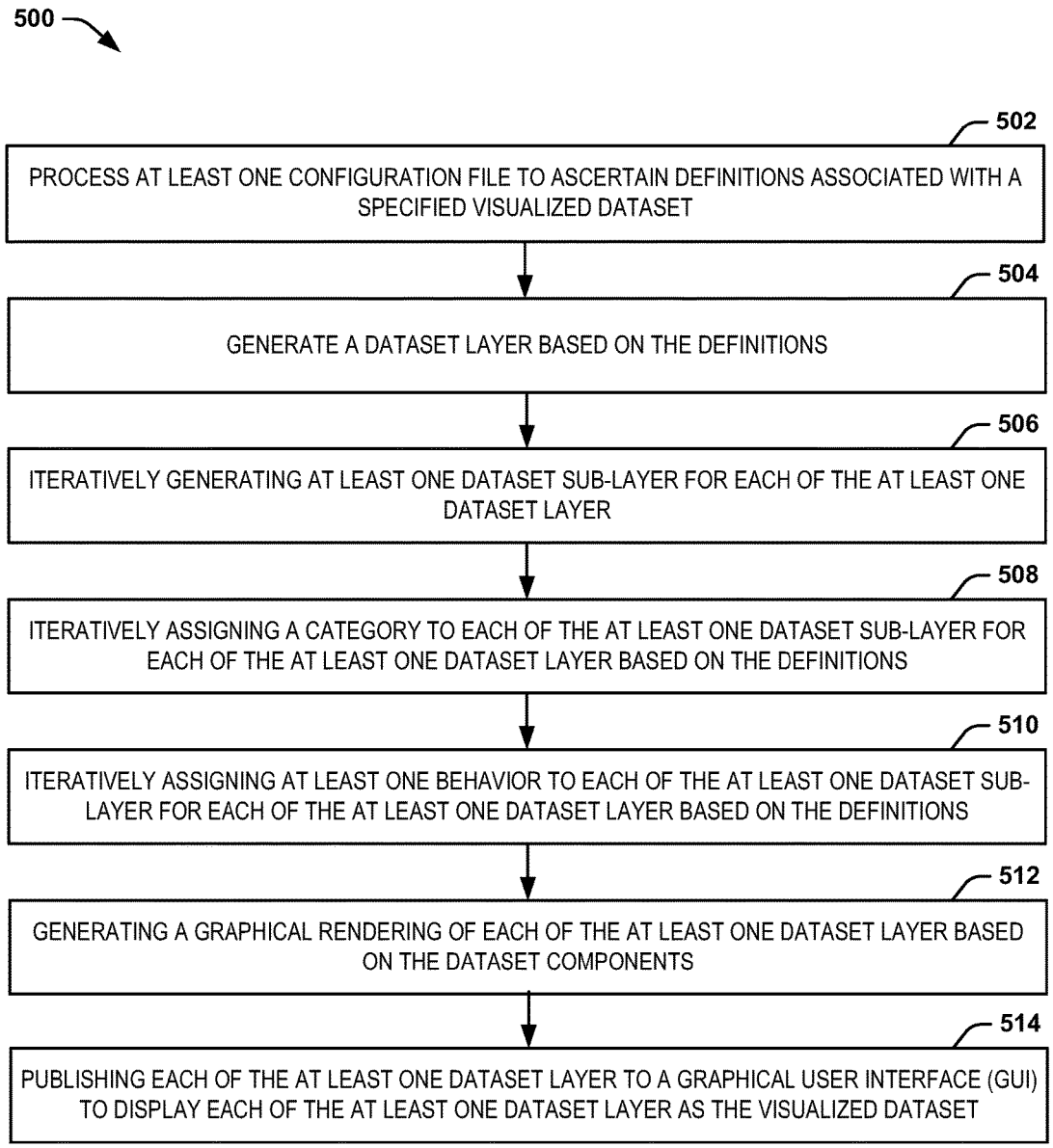
FIG. 11 illustrates an example of a method for automatically implementing an AVIA.

In view of the foregoing structural and functional features described above, a methodology in accordance with various aspects of the present disclosure will be better appreciated with reference to FIGS. 9-11. While, for purposes of simplicity of explanation, the methodology of FIGS. 9-11 is shown and described as executing serially, it is to be understood and appreciated that the present disclosure is not limited by the illustrated order, as some aspects could, in accordance with the present disclosure, occur in different orders and/or concurrently with other aspects from that shown and described herein. Moreover, not all illustrated features may be required to implement a methodology in accordance with an aspect of the present disclosure.

FIG. 9 illustrates an example of a method 400 for automatically implementing an automated visualization and interaction algorithm (the AVIA 16). At 402, at least one configuration file (e.g., the configuration file(s) 26) is processed to ascertain definitions associated with a specified visualized dataset. At 404, queries (e.g., the queries QRY) are generated and provided to a data management tool (e.g., the data management tool 12) via a network service interface (e.g., the network service interface 18) based on the definitions to access dataset components (e.g., the dataset components 24) from the data management tool. At 406, a dataset layer (e.g., the dataset layers 54) is generated based on the dataset components. At 408, a category (e.g., the category 110) is assigned to the dataset layer based on the dataset components. The category can correspond to visualization grouping of the dataset layer based on a unique identifier. At 410, at least one behavior is assigned to the dataset layer based on the dataset components. The at least one behavior can define visual characteristics of the dataset layer. At 412, a graphical rendering of the dataset layer is generated based on the dataset components to display the dataset layer as a visualized dataset (e.g., the visualized dataset 30) via a graphical user interface (GUI) (e.g., the GUI 28).

FIG. 10 illustrates an example of a method 450 for automatically implementing an automated visualization and interaction algorithm (the AVIA 16). At 452, at least one configuration file (e.g., the configuration file(s) 26) is processed to ascertain definitions associated with a specified visualized dataset. At 454, a geospatial map software program configured to provide a geographical map (e.g., via the map definition 52) is accessed. At 456, a dataset layer (e.g., the dataset layers 54) is generated based on the definitions. At 458, a category (e.g., the category 110) is assigned to the dataset layer based on the definitions. The category can correspond to visualization grouping of the dataset layer based on a unique identifier. At 460, at least one behavior is assigned to the dataset layer based on the definitions. The at least one behavior can define visual characteristics of the dataset layer. At 462, at least one interactive component (e.g., based on the callout(s) 108) associated with the dataset layer is generated based on the definitions. The at least one interactive component can define a respective at least one interactive characteristic of the dataset layer in response to a user input. At 464, a graphical rendering of the dataset layer is generated based on the definitions to display the dataset layer as a visualized dataset (e.g., the visualized dataset 30) via a graphical user interface (GUI) (e.g., the GUI 28).

FIG. 11 illustrates an example of a method 500 for automatically implementing an automated visualization and interaction algorithm (the AVIA 16). At 502, at least one configuration file (e.g., the configuration file(s) 26) is processed to ascertain definitions associated with a specified visualized dataset. At 504, at least one dataset sub-layer is iteratively generated for each of the at least one dataset layer. Each of the at least one dataset sub-layer can correspond to a feature associated with the respective one of the dataset layer. At 506, a category (e.g., the category 110) is iteratively assigned to each of the at least one dataset sub-layer for each of the at least one dataset layer based on the definitions. The category can correspond to visualization grouping of the respective at least one dataset sub-layer based on a unique identifier. At 508, at least one behavior (e.g., based on the callout(s) 108) is iteratively assigned to each of the at least one dataset sub-layer for each of the at least one dataset layer based on the definitions. The at least one behavior can define visual characteristics of the respective at least one dataset sub-layer. At 510, a graphical rendering of each of the at least one dataset layer is generated based on the dataset components. At 512, each of the at least one dataset layer is published to a graphical user interface (GUI) (e.g., the GUI 28) to display each of the at least one dataset layer as the visualized dataset (e.g., the visualized dataset 30).

What have been described above are examples of the invention. It is, of course, not possible to describe every conceivable combination of components or method for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A non-transitory computer readable medium configured to store instructions that, when executed, are configured to implement a method for automatically implementing an automated visualization and interaction algorithm, the method comprising:

processing at least one configuration file to ascertain definitions associated with a specified visualized dataset;

generating and providing queries to a data management tool via a network service interface based on the definitions to access dataset components from the data management tool;

generating a dataset layer based on the dataset components;

assigning a category to the dataset layer based on the dataset components, the category corresponding to visualization grouping of the dataset layer based on a unique identifier;

assigning at least one behavior to the dataset layer based on the dataset components, the at least one behavior defining visual characteristics of the dataset layer; and generating a graphical rendering of the dataset layer based on the dataset components to display the dataset layer as a visualized dataset via a graphical user interface (GUI).

2. The non-transitory computer readable medium of claim 1, wherein generating and providing the queries comprises:

extracting a uniform resource identifier (URI) associated with a database from the at least one configuration file for each of the dataset components; and providing the URI in the respective one of the queries to access the respective one of the dataset components from the database.

3. The non-transitory computer readable medium of claim 2, wherein the database comprises the dataset components having been stored via the data management tool in response to shape files associated with a digital aeronautical flight information file (DAFIF).

4. The non-transitory computer readable medium of claim 1, further comprising generating at least one interactive component associated with the dataset layer based on the dataset components, the at least one interactive component defining a respective at least one interactive characteristic of the dataset layer in response to a user input.

5. The non-transitory computer readable medium of claim 4, wherein generating the at least one interactive component comprises generating graphical interaction tools that are configured to facilitate user manipulation of the display of the dataset layer via the GUI in response to the user input based on the definitions.

6. The non-transitory computer readable medium of claim 5, wherein the graphical interaction tools comprise:

at least one toggle control for selectively activating and deactivating the dataset layer and at least one dataset sub-layer, each of the at least one dataset sub-layer corresponding to a feature associated with the dataset layer, wherein the selectively activating and deactivating alters a visual characteristic of the dataset layer and the at least one dataset sub-layer; and at least one data balloon that is displayed in response to at least one of the toggle controls and a mouse-over input.

7. The non-transitory computer readable medium of claim 1, wherein processing the at least one configuration file comprises processing the at least one configuration file to access a geospatial map software program configured to provide a geographical map on which the dataset layer is superimposed in the visualized dataset.

8. The non-transitory computer readable medium of claim 1, further comprising:

generating at least one dataset sub-layer corresponding to a feature associated with the dataset layer based on the dataset components; and assigning at least one behavior to the at least one dataset sub-layer based on the dataset components, the at least one behavior defining visual characteristics of the at least one dataset sub-layer; and generating at least one interactive component associated with the at least one dataset sub-layer based on the dataset components, the at least one interactive component defining a respective at least one interactive characteristic of the at least one dataset sub-layer in response to a user input.

9. The non-transitory computer readable medium of claim 1, wherein generating the dataset layer based on the dataset components comprises generating a plurality of dataset layers based on the dataset components, wherein, for each of the plurality of dataset layers in an iterative sequence, the method comprises;

assigning a category to a respective one of the plurality of dataset layers based on the dataset components, the category corresponding to visualization grouping of the respective one of the plurality of dataset layers based on a unique identifier;

assigning at least one behavior to the respective one of the plurality of dataset layers based on the dataset components, the at least one behavior defining visual characteristics of the respective one of the plurality of dataset layers; and generating a graphical rendering of the respective one of the plurality of dataset layers based on the dataset components;

wherein the method further comprises publishing the plurality of dataset layers to the GUI to display the plurality of dataset layers as the visualized dataset.

10. The non-transitory computer readable medium of claim 1, wherein assigning the at least one behavior to the dataset layer comprises assigning the at least one behavior to the dataset layer to define a default visualization state of each of a plurality of dataset sub-layers corresponding to features associated with the dataset layer as being one of active and passive in the visualized dataset.

11. The non-transitory computer readable medium of claim 10, wherein assigning the at least one behavior to the dataset layer comprises assigning the at least one behavior to the dataset layer to define a default visualization state of each of a plurality of existing dataset sub-layers corresponding to features associated with the dataset layer as being one of active and passive in the visualized dataset.

12. The non-transitory computer readable medium of claim 1, wherein the category provides visual coordination of each of a plurality of features of the dataset using components of the GUI.

13. A non-transitory computer readable medium configured to store instructions that, when executed, are configured to implement a method for automatically implementing an automated visualization and interaction algorithm, the method comprising:

processing at least one configuration file to ascertain definitions associated with a specified visualized dataset;

accessing a geospatial map software program configured to provide a geographical map;

generating a dataset layer based on the definitions;

assigning a category to the dataset layer based on the definitions, the category corresponding to visualization grouping of the dataset layer based on a unique identifier;

assigning at least one behavior to the dataset layer based on the definitions, the at least one behavior defining visual characteristics of the dataset layer;

generating at least one interactive component associated with the dataset layer based on the definitions, the at least one interactive component defining a respective at least one interactive characteristic of the dataset layer in response to a user input; and generating a graphical rendering of the dataset layer on the geographical map based on the dataset components to display the dataset layer superimposed on the geographical map as a visualized dataset via a graphical user interface (GUI).

14. The non-transitory computer readable medium of claim 13, wherein processing the at least one configuration file comprises:

generating and providing queries to a data management tool via a network service interface based on the definitions to access dataset components from the data management tool; and associating the dataset components with the definitions in response to receiving query responses.

15. The non-transitory computer readable medium of claim 14, wherein generating and providing the queries comprises:

extracting a uniform resource identifier (URI) associated with a database from the at least one configuration file for each of the dataset components; and providing the URI in the respective one of the queries to access the respective one of the dataset components from the database.

16. The non-transitory computer readable medium of claim 13, further comprising:

generating at least one dataset sub-layer corresponding to a feature associated with the dataset layer based on the definitions;

assigning at least one behavior to the at least one dataset sub-layer based on the definitions, the at least one behavior defining visual characteristics of the at least one dataset sub-layer;

generating at least one interactive component associated with the at least one dataset sub-layer based on the definitions, the at least one interactive component defining a respective at least one interactive characteristic of the at least one dataset sub-layer in response to the user input.

17. The non-transitory computer readable medium of claim 13, wherein generating the dataset layer based on the definitions comprises generating a plurality of dataset layers based on the definitions, wherein, for each of the plurality of dataset layers in an iterative sequence, the method comprises;

assigning a category to a respective one of the plurality of dataset layers based on the definitions, the category corresponding to visualization grouping of the respective one of the plurality of dataset layers based on a unique identifier;

assigning at least one behavior to the respective one of the plurality of dataset layers based on the definitions, the at least one behavior defining visual characteristics of the respective one of the plurality of dataset layers;

generating at least one interactive component associated with the respective one of the plurality of dataset layers based on the definitions, the at least one interactive component defining a respective at least one interactive characteristic of the respective one of the plurality of dataset layers in response to a user input; and generating a graphical rendering of the respective one of the plurality of dataset layers based on the definitions;

wherein publishing the dataset layer comprises publishing the plurality of dataset layers to the GUI that is configured to display the plurality of dataset layers as the visualized dataset.

18. The non-transitory computer readable medium of claim 13, wherein generating the at least one interactive component comprises generating graphical interaction tools that are configured to facilitate user manipulation of the display of the dataset layer via the GUI in response to the user input based on the definitions.

19. A non-transitory computer readable medium configured to store instructions that, when executed, are configured to implement a method for automatically implementing an automated visualization and interaction algorithm, the method comprising:

processing at least one configuration file to ascertain definitions associated with a specified visualized dataset;

generating at least one dataset layer based on the definitions;

iteratively generating at least one dataset sub-layer for each of the at least one dataset layer, each of the at least one dataset sub-layer corresponding to a feature associated with the respective one of the dataset layer;

iteratively assigning a category to each of the at least one dataset sub-layer for each of the at least one dataset layer based on the definitions, the category corresponding to visualization grouping of the respective at least one dataset sub-layer based on a unique identifier;

iteratively assigning at least one behavior to each of the at least one dataset sub-layer for each of the at least one dataset layer based on the definitions, the at least one behavior defining visual characteristics of the respective at least one dataset sub-layer;

generating a graphical rendering of each of the at least one dataset layer based on the dataset components; and publishing each of the at least one dataset layer to a graphical user interface (GUI) to display each of the at least one dataset layer as the visualized dataset.

20. The non-transitory computer readable medium of claim 19, further comprising iteratively generating at least one interactive component associated with each of the at least one dataset sub-layer for each of the at least one dataset layer based on the definitions, the at least one interactive component defining a respective at least one interactive characteristic of the respective at least one dataset sub-layer in response to a respective user input.

21. The non-transitory computer readable medium of claim 19, wherein generating and providing the queries comprises:

extracting a uniform resource identifier (URI) associated with a database from the at least one configuration file for each of the dataset components; and providing the URI in the respective one of the queries to access the respective one of the dataset components from the database.

22. The non-transitory computer readable medium of claim 19, wherein iteratively assigning the at least one behavior comprises iteratively assigning the at least one behavior to each of the at least one dataset sub-layer for each of the at least one dataset layer to define a default visualization state of each of the at least one dataset sub-layer as being one of active and passive in the visualized dataset.

* * * * *